(12) United States Patent
Friedl et al.

(10) Patent No.: US 10,931,098 B2
(45) Date of Patent: Feb. 23, 2021

(54) ENERGY SUPPLY CIRCUIT, ELECTRICAL DRIVE SYSTEM, AND MISSILE COMPRISING AN ELECTRIC DRIVE SYSTEM

(71) Applicant: Airbus Defence and Space GmbH, Taufkirchen (DE)

(72) Inventors: Stephan Friedl, Bad Wiessee (DE); Gerhard Steiner, Mindelheim (DE)

(73) Assignee: Airbus Defence and Space GmbH, Taufkirchen (DE)

( * ) Notice: Subject to any disclaimer, the term of this patent is extended or adjusted under 35 U.S.C. 154(b) by 522 days.

(21) Appl. No.: 15/849,102

(22) Filed: Dec. 20, 2017

(65) Prior Publication Data

US 2018/0205218 A1    Jul. 19, 2018

(30) Foreign Application Priority Data

Dec. 21, 2016  (EP) .................................... 16205965

(51) Int. Cl.
*H02H 7/085*  (2006.01)
*H02J 7/00*   (2006.01)
*H02J 1/10*   (2006.01)

(52) U.S. Cl.
CPC ........... *H02H 7/0856* (2013.01); *H02J 1/108* (2013.01); *H02J 7/0024* (2013.01); *H02J 7/0031* (2013.01); *H02J 7/0063* (2013.01)

(58) Field of Classification Search
CPC ... F41B 6/00; H01M 10/4257; H01M 10/441; H01M 10/482; H01M 10/486;
(Continued)

(56) References Cited

U.S. PATENT DOCUMENTS

| 3,100,851 A | * | 8/1963 | Ross | .................. | H03B 11/10 |
| | | | | | 307/107 |
| 9,318,779 B2 | * | 4/2016 | Uno | .................. | H01M 10/44 |

(Continued)

FOREIGN PATENT DOCUMENTS

DE    102013000168 A1    7/2014

OTHER PUBLICATIONS

Extended European Search Report for Application No. 16205965.3 dated Jul. 5, 2017.

*Primary Examiner* — Jared Fureman
*Assistant Examiner* — Nicolas Bellido
(74) *Attorney, Agent, or Firm* — Jenkins, Wilson, Taylor & Hunt, P.A.

(57) ABSTRACT

An energy supply device for reliably supplying energy to electrical loads, provides the energy supply by constant voltage sources. The number of constant voltage sources corresponds to the number of electrical loads. The energy supply device has a deactivatable balancing network. In this case, only the compensating currents are conducted via the balancing network, while the energy supply is provided via a direct electrical connection between the constant voltage source and the load. If a fault occurs, the balancing network can be deactivated. Faults in one branch thus do not affect the level of reliability of the energy supply in the remaining branches. After a faulty component has been located and isolated, the sources that are still intact, and the intact loads, can be brought back into operation by suitably configuring the balancing network. The availability of the drive system can thus be increased.

11 Claims, 4 Drawing Sheets

(58) Field of Classification Search
CPC ............. H01M 10/613; H01M 10/625; H01M 10/647; H01M 10/6557; H01M 10/6563; H01M 2/1077; H01M 2/1241; H01M 2/20; H01M 2/24; H01M 2010/4271; H02H 7/0856; H02J 1/108; H02J 2310/44; H02J 7/0016; H02J 7/0024; H02J 7/0031; H02J 7/0045; H02J 7/0063; Y02T 10/7055; Y10T 307/653

See application file for complete search history.

(56) References Cited

U.S. PATENT DOCUMENTS

| | | | |
|---|---|---|---|
| 2005/0023054 A1* | 2/2005 | Weidenheimer | H02J 7/0024 180/65.25 |
| 2007/0062744 A1* | 3/2007 | Weidenheimer | H02J 7/0024 307/71 |
| 2007/0273216 A1 | 11/2007 | Farbarik | |
| 2010/0231167 A1* | 9/2010 | Ohnuki | H02J 2207/20 320/119 |
| 2015/0303527 A1* | 10/2015 | Maxwell | H01M 10/4257 429/50 |
| 2017/0166065 A1* | 6/2017 | Hong | H02J 7/0021 |
| 2018/0127116 A1* | 5/2018 | Rozman | B64G 1/428 |

\* cited by examiner

ENERGY SUPPLY CIRCUIT, ELECTRICAL DRIVE SYSTEM, AND MISSILE COMPRISING AN ELECTRIC DRIVE SYSTEM

CROSS-REFERENCE TO RELATED APPLICATION

This application claims priority to European Patent Application EP 16 205 965.3 filed Dec. 21, 2016, the entire disclosure of which is incorporated by reference herein.

TECHNICAL FIELD

The present disclosure relates to an energy supply circuit for supplying energy to a plurality of electrical loads, an electric drive system comprising an energy supply circuit, and a missile comprising an electric drive system.

BACKGROUND

Flying machines comprising a plurality of electric drives are known. In this case, a plurality of rotors can be operated using a separate electric drive in each case. In this case, the electric drives must be supplied with energy from a constant voltage source.

DE 10 2013 000 168 A1 discloses a flying machine comprising a plurality of rotors. In particular electric motors can be used as drives for the rotors. The electric motors can be supplied with energy by onboard batteries.

SUMMARY

It is an object of the present disclosure to disclose a device for a safe and reliable energy supply for a plurality of electrical loads.

Accordingly, in a first aspect, the present disclosure provides an energy supply device for coupling a plurality of constant voltage sources to a plurality of electrical loads. In this case, the number of constant voltage sources corresponds to the number of electrical loads to be supplied. The energy supply device comprises a first connector, a second connector and a control element. The first connector is designed or configured to directly electrically connect an output of a constant voltage source to an input of an electrical load in each case. The second connector is designed or configured to electrically connect an output of a constant voltage source to an input of an electrical load in each case. In this case, each second connector comprises a series circuit consisting of or comprising a first switching element, a first diode and a second diode. The first diode and the second diode are electrically interconnected at a node. Furthermore, all the nodes of the second connector are electrically interconnected. The control element is designed or configured to control the first switching elements together. Moreover, further electronic or mechanical switching elements can be arranged in parallel with the diodes.

According to a second aspect, the present disclosure provides an electric drive system comprising an electrical energy supply device of the first aspect, a plurality of constant voltage sources, and a plurality of electrical loads. The constant voltage sources are designed or configured to each supply an electrical DC voltage. The electrical loads each comprise an electric drive device. The number of constant voltage sources corresponds to the number of electrical loads.

According to a third aspect, the present disclosure provides an electrically driven missile comprising an electric drive system according to the second aspect.

One advantage of the energy supply device according to the disclosure herein is that a plurality of electrical loads can be supplied with electrical energy from a plurality of separate constant voltage sources. In this case, the number of constant voltage sources corresponds to the number of electrical loads to be supplied. That is to say that one constant voltage source is associated with each electrical load. Using a plurality of individual constant voltage sources reduces the electrical power that is supplied by one of the constant voltage sources in the event of a fault, for example a short circuit. As a result, the fault currents occurring in the process can be better controlled. Therefore, in the event of a fault, the corresponding constant voltage sources can be reliably electrically disconnected using existing and available protection elements.

Furthermore, the energy supply device according to the disclosure herein allows uniform loading of all the constant voltage sources. All the constant voltage sources connected to the energy supply device are uniformly loaded during operation. Thus, for example, batteries, as constant voltage sources, are uniformly discharged. In this case, the components of the second connector of the energy supply device are loaded only with compensating currents that may be required (balancing). In contrast, the majority of the electrical energy from the constant voltage source to the relevant load flows via a direct electrical connection. In this way, very high efficiency for the load distribution can be achieved.

Moreover, the energy supply device according to the disclosure herein continues to allow a reliable energy supply, even in the event of a fault. For this purpose, in the event of a fault, the individual systems can be separated very easily, and therefore influence of a faulty component on the overall system can be minimised.

The individual constant voltage sources, as well as the individual loads, can also consist of a subgroup of smaller constant voltage sources or loads. In the following, both an individual constant voltage source and a subgroup of constant voltage sources will be referred to as a constant voltage source. Likewise, an individual load and a subgroup of loads will also be referred to in the following as a load.

In the present disclosure, the term "diodes" is in particular understood to mean all components that allow a unidirectional current flow, i.e. the component conducts an electrical current in a specified direction, whereas it blocks an electrical current flow in the opposite direction.

According to one embodiment, the energy supply device comprises a monitor designed or configured to detect a malfunction in one of the constant voltage sources and/or in one of the electrical loads. A malfunction in the overall assembly could also be detected by monitoring the phase currents. If the monitor has detected a malfunction of this kind, control elements open the first switching elements in the second connector. In this way, in the event of a fault, the network interconnected by the energy supply device can be split up. A fault in one of the constant voltage sources or in one of the electrical loads thus no longer affects the energy supply to the remaining components.

According to one embodiment, the second connector of the energy supply device each comprise a second switching element that is arranged in parallel with the first diode, and a third switching element that is arranged in parallel with the second diode. The relevant diodes can be bridged by these switching elements. The switching elements may be any desired switching elements, such as mechanical switching elements or semiconductor switching elements. In particular, MOSFET or bipolar transistors having an insulated gate (IGBT) are possible for example. However, any other suitable switching elements, such as silicon carbide (SiC) semiconductor switches or other semiconductor switches are also possible. Since the electrical losses through a closed switching element are generally lower than the electrical losses of a current that flows through a diode in the forward direction, the electrical losses can be lowered, and thus the efficiency of the system can be increased, by actuating the switching elements.

According to one embodiment, the energy supply device comprises a controller. The controller is designed or configured to determine an electrical current through the first diode and/or an electrical current through the second diode. If the electrical current through one of the first diodes and/or one of the second diodes exceeds a specified threshold, the controller can switch the relevant switching element provided in parallel with this diode into a conductive state. In this way, the electrical losses resulting from an electrical current through the relevant diode can be minimised.

According to one embodiment, the controller is designed or configured to calculate, or at least estimate, the electrical current flow through the first diodes and/or the electrical current flow through the second diodes from a switching state of the constant voltage sources and/or a switching state of the electrical loads. For example, a possible compensating current in the energy supply device can be concluded from a deactivated electrical load or a constant voltage source that is disconnected from the energy supply device. In accordance with an electrical compensating current of this kind that is to be expected, the switching elements in parallel with the relevant diodes can be actuated in order to minimise the electrical losses.

According to one embodiment, the controller is designed or configured to determine the electrical current flow through the first diodes and/or the electrical current flow through the second diodes on the basis of measured values, detected by sensors, in the constant voltage sources and/or the electrical loads. In particular, if corresponding current sensors are already provided in the constant voltage sources or the electrical loads, these measured values of the sensors can be used in order to conclude, therefrom, a possible compensating current in the energy supply device. On the basis of a compensating current of this kind, the relevant switching elements that are provided in parallel with the diodes can be actuated in order to minimise the electrical losses.

According to one embodiment of the electric drive system, the constant voltage sources comprise a disconnector. This disconnector is designed or configured to interrupt an electrical connection between the constant voltage source and the energy supply device. The disconnector can, for example, be a battery safety switch, an overcurrent protection device, or the like. Since a separate disconnector is provided for each constant voltage source, each of the disconnector only has to control the fault currents, to be expected in the event of a fault, of one constant voltage source.

According to one embodiment, the constant voltage sources each comprise an electrical energy store, in particular a battery.

According to one embodiment, a storage capacity of the electrical energy store is in each case adapted to an energy consumption, to be expected, of a corresponding electrical load. In this way, the individual energy stores are discharged as uniformly as possible, and therefore only relatively low compensating currents are to be expected. Consequently, the electrical losses, due to the compensating currents, within the energy supply device also reduce.

The above-mentioned embodiments and developments can be combined in any manner, if appropriate. Further possible embodiments, developments and implementations of the disclosure herein include combinations of features of the disclosure herein described previously or below with respect to the embodiments, even if not explicitly specified. In particular, a person skilled in the art will also add individual aspects as improvements or supplements to the particular basic forms of the present disclosure.

BRIEF DESCRIPTION OF THE DRAWINGS

The present disclosure will be described in greater detail below with reference to the embodiments shown in the schematic drawings, in which.

Figure 1:
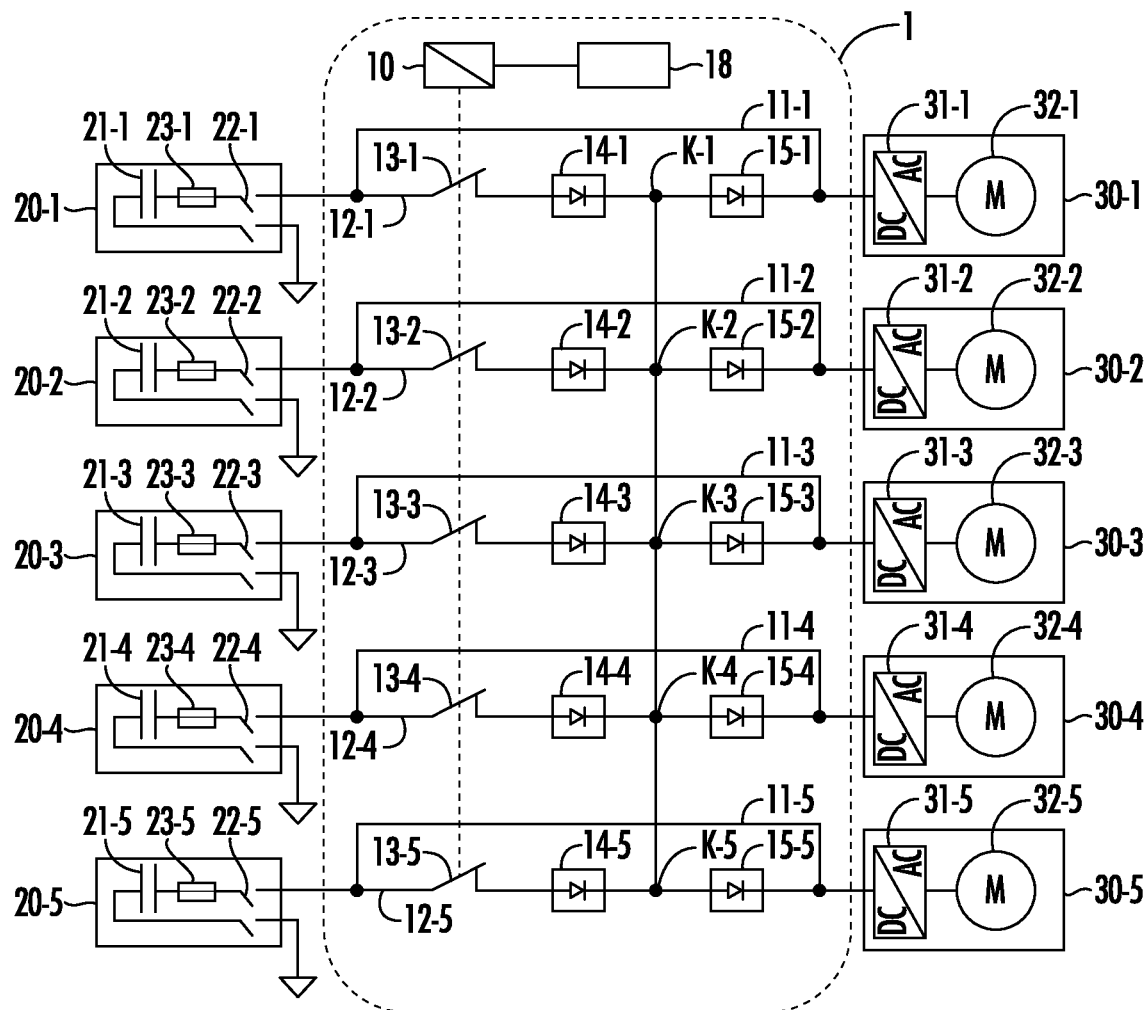
FIG. 1 is a schematic drawing of an electric drive system comprising an energy supply device according to one embodiment.

The accompanying drawings are intended to facilitate further understanding of the embodiments of the disclosure herein. The drawings illustrate embodiments and, together with the description, serve to explain principles and concepts of the disclosure herein. Other embodiments and many of the advantages mentioned can be found with reference to the drawings. The elements of the drawings are not necessarily shown true to scale relative to one another.

In the figures of the drawings, identical, functionally identical and identically operating elements, features and components are in each case provided with the same reference numerals, unless indicated otherwise.

DETAILED DESCRIPTION

FIG. 1 is a schematic drawing of an electric drive system comprising an energy supply device 1 according to one embodiment. The electric drive system comprises a plurality of electric drive units 30-1. In the embodiment shown here, the drive units 30-$i$ each comprise an electrical converter 31-$i$, for example a single-phase or multi-phase inverter. The converter 31-$i$ can supply an electric motor 32-$i$. Furthermore, however, any alternative electric drive units 30-$i$ are also possible. The number of five electric drive units 30-1 to 30-5 shown here serves only for understanding, and does not limit the present disclosure. Furthermore, any other number of electric drive units 30-$i$ is also possible. For example, the electric drive system can also comprise just two, three, four or even six and more electric drive units 30-$i$.

In the following, the electric drive units 30-$i$ are in each case shown and described as units having just one converter 31-$i$ and just one electric motor 32-$i$. However, this applies only for easier understanding, and does not limit the present disclosure. Furthermore, drive units 30-$i$ having a plurality of converters 31-$i$ and/or a plurality of electric motors 32-$l$ are also possible. In particular, one or more of the drive units 30-$i$ described here can also comprise a plurality of subgroups of drive units having individual converters and electric motors.

The electric drive system further comprises a plurality of constant voltage sources 20-$i$. In this case, the number of constant voltage sources 20-$i$ corresponds to the number of electric drive units 30-$i$. That is to say that just as many constant voltage sources 20-$i$ are provided as there are electric drive units 30-$i$ available. One constant voltage source 20-$i$ is associated with each electric drive unit 30-$i$.

For improved understanding, the individual constant voltage sources 20-$i$ are shown here as units each comprising one constant voltage source. However, this does not limit the present disclosure. Rather, constant voltage sources comprising a plurality of subgroups consisting of or comprising constant voltage sources connected in parallel and/or in series are also possible as constant voltage sources 20-$i$. As will be explained in greater detail in the following, the individual constant voltage sources 20-$i$ need not be identically designed. Instead, it is sufficient for all the constant voltage sources 20-$i$ to provide an at least approximately equal output voltage. As will be explained in greater detail in the following, in this case, the capacity of the individual constant voltage sources 20-$i$ can be adapted to the drive units 30-$i$ associated with the relevant DC voltage sources 20-$i$.

The constant voltage sources 20-$i$ can be electrical energy stores for example. In particular, the constant voltage sources 20-$i$ can comprise a battery 21-$i$, such as a rechargeable accumulator. Each of the constant voltage sources 20-$i$ can moreover comprise a disconnection switch 22-$i$. The disconnection switch 22-$i$ can for example connect or disconnect an electrical connection between the electrical energy store 21-$i$ and a connection of the energy supply device 1 coupled to the constant voltage source 20-$i$. This disconnector 22-$i$ may, for example, be a battery safety switch or another suitable disconnector. Moreover, the constant voltage sources 20-$i$ can comprise further components, such as an overcurrent protection device 23-$i$. An overcurrent protection device 23-$i$ of this kind can for example interrupt an electrical connection between the electrical energy store 21-$i$ and a connection of the energy supply device 1 coupled to the constant voltage source 20-$i$ when an electrical current from the constant voltage source 20-$i$ exceeds a specified threshold value.

As can be seen in FIG. 1, each constant voltage source 20-$i$ is associated with a corresponding electric drive unit 30-$i$. In this case, in particular each of the constant voltage sources 20-$i$ can be dimensioned in accordance with a power consumption, to be expected, of the corresponding drive unit 30-$i$. For example, a storage capacity of an electrical energy store 21-$i$ in a constant voltage source 20-$i$ can be adapted in accordance with the power consumption, to be expected, of the corresponding drive unit 30-$i$. Accordingly, an energy store 21-$i$ having a high storage capacity can be provided for electric drive units 30-$i$ having a high power consumption, while a lower storage capacity can also be provided for drive units 30-$i$ having a lower power consumption. Furthermore, if necessary, in addition or alternatively, further parameters and/or characteristic variables of the constant voltage source 20-$i$ can be adapted or dimensioned on the basis of characteristic variables of the associated drive units 30-$i$. As a result, each of the constant voltage sources 20-$i$ are at least approximately uniformly loaded by the drive units 30-$i$ associated in each case. Therefore, in normal operation, no or only low compensating currents are to be expected between the individual energy supply branches. These compensation processes that may occur will be described in more detail in the following.

When designing the electric drive system, it should moreover be ensured that an at least approximately equal DC voltage can be provided by all of the constant voltage sources 20-$i$. Accordingly, the individual drive units 30-$i$ must also be able to be supplied with at least approximately equal DC voltages.

An electrical energy supply device 1 in the form of an electrical network is provided between the constant voltage sources 20-$i$ and the drive units 30-$i$. For each pair consisting of or comprising a constant voltage source 20-$i$ and drive unit 30-$i$, the energy supply device 1 in each case comprises a first connector 11-$i$ and a second connector 12-$i$. In this case, the first connector 11-$i$ provides a direct electrical connection between an output of a constant voltage source 20-$i$ and an input of the corresponding electric drive unit 30-$i$. This can be achieved, for example, by a cable connection or by any differently designed electrical connection.

A second connector is provided in parallel with the first connector 11-$i$, between the output of a constant voltage source 20-$i$ and an input of the associated electric drive unit 30-$i$. Between the output of the constant voltage source 20-$i$ and the input of the corresponding electric drive unit 30-$i$, this second connector 12-$i$ in each case comprises a series circuit, consisting of or comprising a switching element 13-$i$, a first diode 14-$i$ and a second diode 15-$i$. The diodes 14-$i$ and 15-$i$ can be any suitable diodes that are capable of carrying the compensating currents that will be described in more detail in the following. Moreover, any desired further components are also possible at the start of the diodes described herein, which components allow an electrical current flow in one direction and block the flow in an opposite direction. The first diode 14-$i$ and the second diode 15-$i$ are electrically interconnected at a node K-$i$. Accordingly, a node K-$i$ of this kind is formed in each case in every second connector 12-$i$, between a constant voltage source 20-$i$ and an associated drive unit 30-$i$. All these nodes K-$i$ in the second connector 12-$i$ are electrically interconnected.

Moreover, the switching elements 13-$i$ in the second connector 12-$i$ are coupled together such that all the switching elements 13-$i$ can be opened or closed together. For this purpose, a control element 10 can be provided that actuates all the switching elements 13-$i$ in the second connector together. This can be achieved, for example, by a multi-polar relay or a multi-polar contactor or the like. Furthermore, any further switching elements, in particular also switching elements based on semiconductor switches, such as MOSFET or IGBT, are also possible.

During a normal operating mode, the switching elements 13-$i$ in the second connector 12-$i$ are closed. For example, the switching elements 13-$i$ can be actuated accordingly by the control element 10. Thus, each constant voltage source 20-$i$ is connected to the corresponding electric drive unit 30-$i$ both by the first connector 11-$i$ and by the second connector 12-$i$. The constant voltage sources 20-$i$ can thus supply the associated drive units 30-$i$ with electrical energy. If, in this case, the constant voltage sources 20-$i$ are optimally adapted to the power consumption of the corresponding drive units 30-$i$, the electric current will thus flow across the first connector 11-$i$. In this case, the electrical losses that occur are particularly low on account of the direct electrical connection.

Optionally, for example on account of an imbalance in the energy consumption of the drive units 30-$i$, it is possible that more electrical energy may be consumed by one or more electric drive units 30-$i$ than is provided by the associated constant voltage source 20-$i$. In this case, an electric current will flow from a further constant voltage source 20-$i$ via the switching element 13-$i$ and the first diode 14-$i$, via the node K-$i$, into the branch in which the drive unit 30-$i$ having the higher power consumption is located. Furthermore, the current will flow to the corresponding drive unit 30-$i$ via the second diode 14-$i$ in this branch. In this way, it is possible, during operation, for electrical energy to be exchanged between the individual branches of the drive system. However, since in this case only the additional compensating currents flow across the switching element 13-$i$ and the diodes 14-$i$ and 15-$i$ involved, the electrical losses occurring across these components are relatively low. Therefore, in this operating mode, very high efficiency can be achieved with low electrical losses.

The electric drive system and in particular the individual electric drive units 30-$i$, as well as the constant voltage sources 20-$i$, can be monitored by a monitor 18 during operation. If a fault occurs in the electric drive system, this fault can thus be detected by the monitor 18.

After a fault has been detected in the drive system, the switching elements 13-$i$ in the second connector 12-$i$ can be opened. As a result, the individual branches are decoupled from one another, and each constant voltage source 20-$i$ then continues to supply the corresponding drive unit 30-$i$ only via the direct first connector 11-$i$. It can thus be ensured that a fault in one branch of the drive system does not affect the further branches of the drive system. The fault-free branches can then continue to be operated, free of disruption. Only balancing, i.e. equalisation of energy between the individual branches, is no longer possible.

In the faulty branch, after the switching elements 13-$i$ in the second connector 12-$i$ have been opened, the electrical connection between the constant voltage source 20-$i$ and the energy supply circuit 1 can be interrupted by the disconnection switch 22-$i$ of the relevant constant voltage source 20-$i$. In this case, the disconnection switch 22-$i$ only has to be designed for the fault current, to be expected, of this individual constant voltage source 20-$i$. For example, this fault current can correspond to a short-circuit current, to be expected, of the constant voltage source 20-$i$.

If there is a fault in the electrically disconnected constant voltage source 20-$i$, which source has been disconnected from the energy supply device 1, the control element 10 can close the switching elements 13-$i$ in the second connector 12-$i$ again after the disconnection switch 22-$i$ has been opened. Thereupon, the constant voltage sources 20-$i$ that are still connected to the energy supply device 1 can also supply electrical energy, via the nodes K-$i$, to the drive unit 30-$i$ of which the constant voltage source 20-$i$ is now disconnected from the energy supply circuit 1.

Alternatively, if there is a fault in a drive unit 30-$i$, the relevant drive unit 30-$i$ can optionally be disconnected from the energy supply circuit 1 by a further disconnection switch in the drive units 30-$i$ (not shown here). Thereupon, too, the switching elements 13-$i$ can be closed again so that the constant voltage source 20-$i$ associated with the faulty drive unit 30-$i$ can also continue to supply electrical energy into the energy supply circuit 1. This electrical energy that is additionally supplied can also be provided, via the nodes K-$i$, to the drive units 30-$i$ that are still connected.

Figure 2:
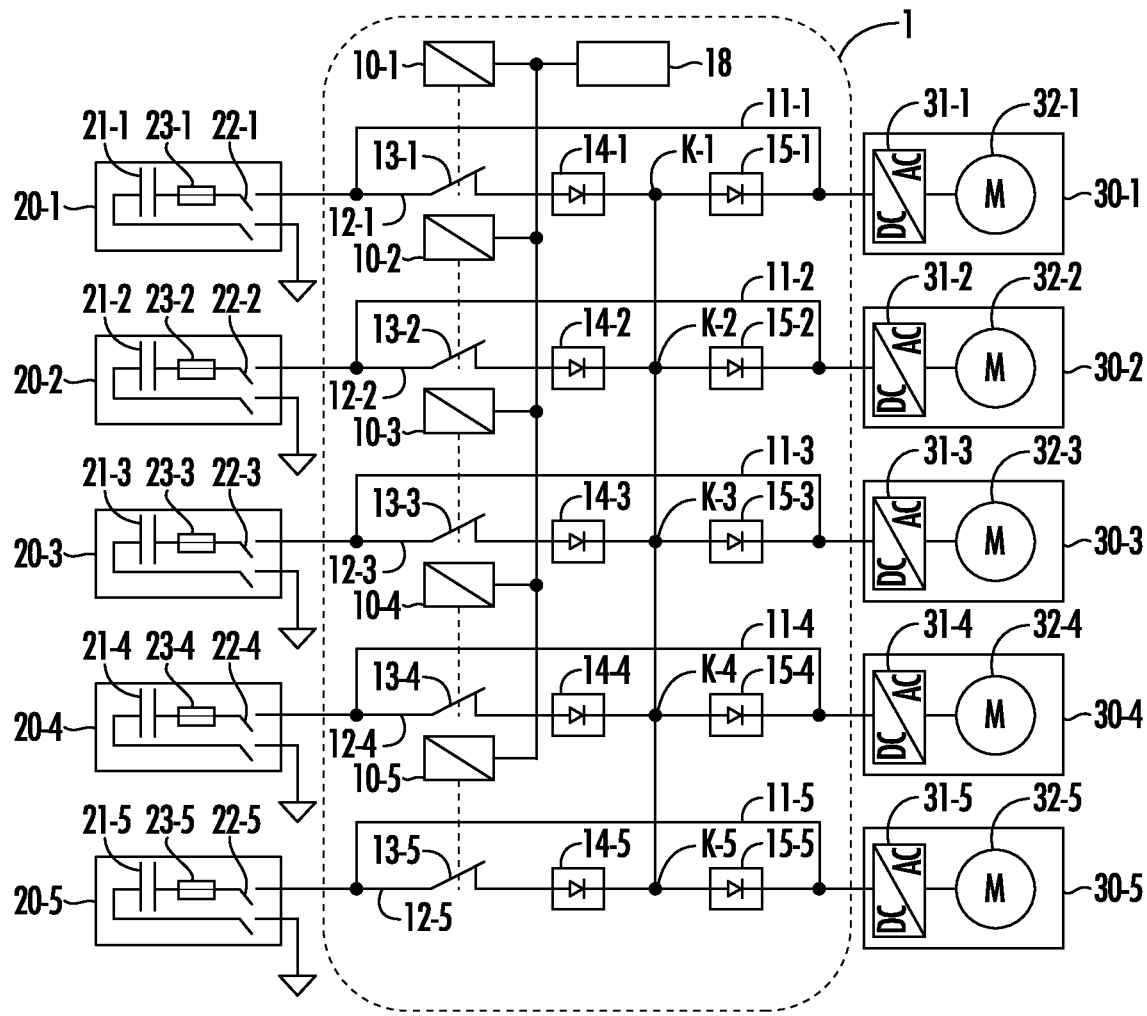
FIG. 2 is a schematic drawing of an electric drive system comprising an energy supply device according to a further embodiment.

FIG. 2 is a schematic drawing of an electric drive system comprising an energy supply device 1 according to a further embodiment. The embodiment shown here substantially corresponds to the embodiment described above, the switching elements 13-$i$ each being able to be actuated individually by separate control elements 10-$i$. In this way, each switching element 13-$i$ can be opened or closed individually.

In this case, the monitor 18 can specify an individual switching state for each switching element 13-$i$. On the basis of these specified switching states, the individual control elements 10-$i$ can open or close the relevant switching elements 13-$i$ individually.

In a normal, fault-free operating state, all the switching elements 13-$i$ are closed by the relevant control elements 10-$i$, just as in the example described above. Following the occurrence of a fault and corresponding detection of the fault by the monitor 18, the monitor 18 can thereupon determine a configuration for the energy supply device 1 in which the faulty component is isolated from the other components. For this purpose, for example a faulty constant voltage source 20-$i$ and/or a faulty load 30-$i$ can be disconnected from the energy supply device 1.

Optionally, in addition or alternatively, by accordingly individually opening and closing the switching elements 13-$i$, a switching state can be set in the energy supply device 1 in which faulty components that may have been detected by the monitor 18 are isolated from the intact components. The faulty components can be connected constant voltage sources 20-$i$ or connected loads 30-$i$, for example. Furthermore, it is also possible for the monitor 18 to also detect faults within the energy supply device 1 and for the energy supply device 1 to subsequently be configured accordingly.

Figure 3:
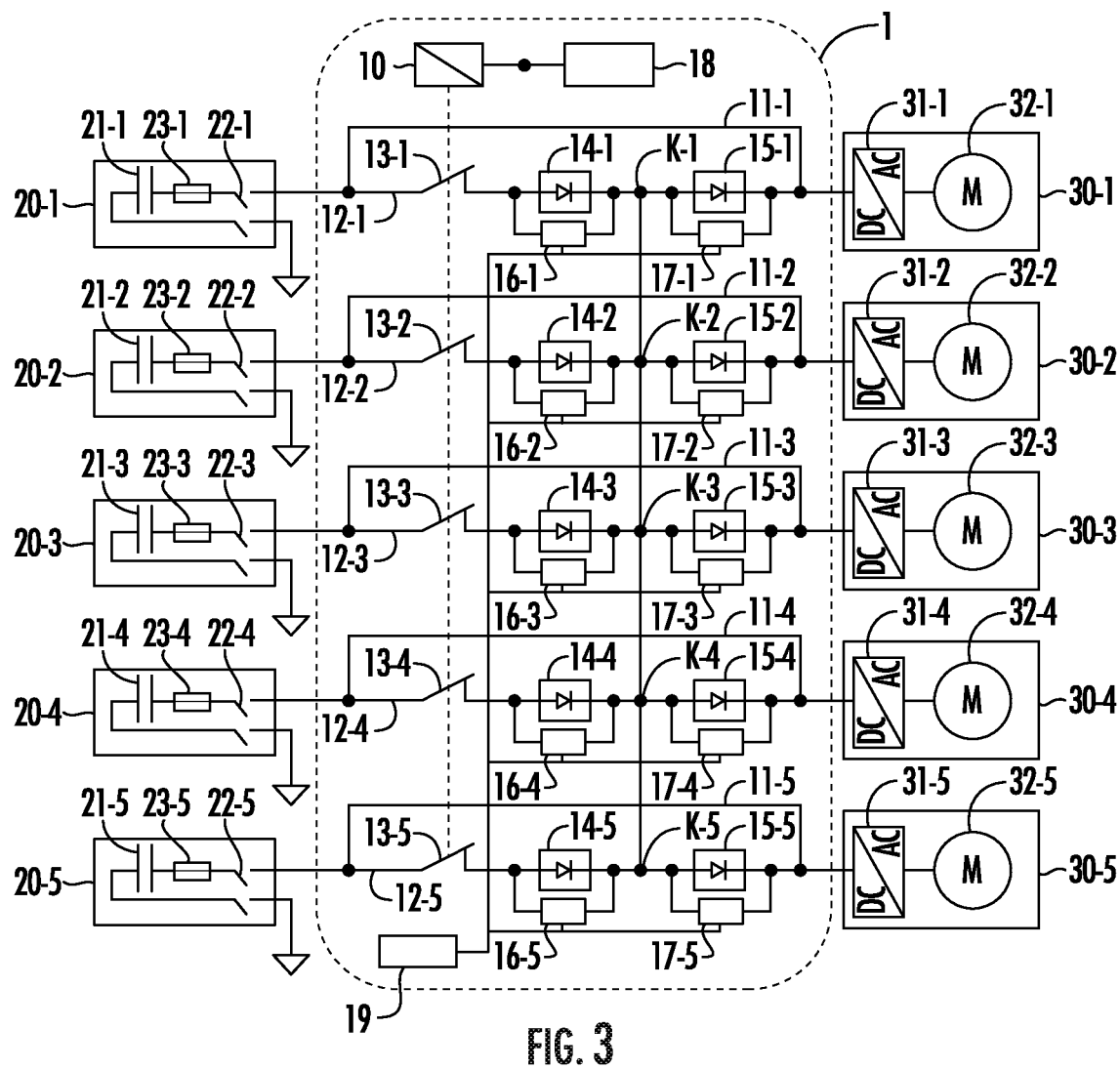
FIG. 3 is a schematic drawing of an electric drive system comprising an energy supply device according to yet a further embodiment.

FIG. 3 is a schematic drawing of an electric drive system comprising an energy supply device 1 according to a further embodiment. The embodiment shown here substantially corresponds to the embodiments described above, and can be combined as desired, in a suitable manner, with the embodiments described above. In this embodiment, additional switching elements 16-$i$ and 17-$i$ are provided in each case in parallel with the first diodes 14-$i$ and 15-$i$. These switching elements 16-$i$ and 17-$i$ can be any desired switching elements that are designed or configured to carry the necessary electrical compensating currents. For example, the switching elements 16-$i$ and 17-$i$ can be mechanical switching elements, such as a contactor or the like. Furthermore, switching elements based on semiconductor switches, such as MOSFET or IGBT, are also possible. These switching elements 16-$i$ and 17-$i$ can be actuated individually by a controller 19 for example. As long as the relevant switching elements 16-$i$ and 17-$i$ are open, an electrical compensating current which may occur flows through the relevant diodes 14-$i$ and 15-$i$. In order to minimise the electrical losses that may occur in this case, the switching elements 16-$i$ and/or 17-$i$ on the relevant diodes 14-$i$ and 15-$i$ can be closed when a compensating current of this kind occurs. The corresponding diodes 14-$i$ and 15-$i$ are thus bridged. Thereupon, an electrical current will flow through the closed switching elements 16-$i$ and 17-$i$. On account of the lower electrical losses in closed switching elements 16-$i$ and 17-$i$ of this kind, the dissipated power in the energy supply circuit 1, which power is otherwise converted in the diodes 14-$i$ and 15-$i$, can be reduced, as a result of which the efficiency of the system can be increased. In this case, the controller 19 can determine in each case, on the basis of measured values detected by sensors, such as measured electrical currents and/or information regarding switching states in the constant voltage sources 20-$i$ or the drive units 30-$i$, at which diodes 14-$i$ and 15-$i$ an electrical compensating current is to be expected. Thereupon, the controller 19 can close the corresponding switching elements 16-$i$ and 17-$i$ on those diodes through which an electrical current is flowing.

Although the present disclosure has been described above using the example of an electric drive system, the present disclosure is not limited thereto. Rather, the energy supply device 1 can also be used to supply energy to any other electrical loads. For example, it is also possible to use the described energy supply device to supply energy to fuel pumps or other electrical loads.

Figure 4:
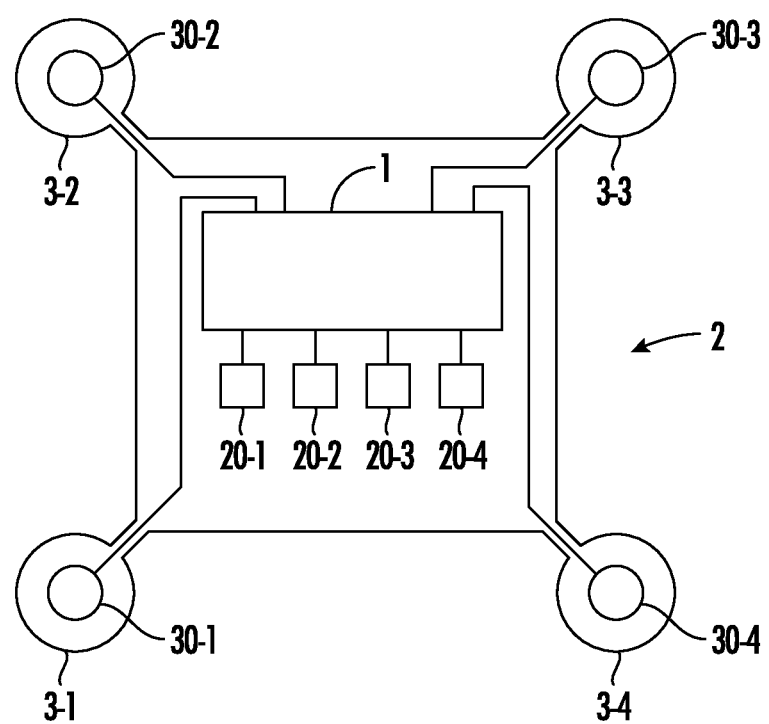
FIG. 4 is a schematic view of a missile comprising an electric drive system according to one embodiment.

FIG. 4 is a schematic view of an electrically driven missile 2 comprising an electric drive system according to one embodiment. In the embodiment shown here, the missile 2 comprises four rotors 3-$i$ that are each driven by a drive unit 30-$i$. The individual drive units 30-$i$ are supplied with electrical energy from the electrical energy stores 20-$i$ by an energy supply device 1 as described above.

In summary, the present disclosure relates to an energy supply device for reliably supplying energy to a plurality of electrical loads, the energy supply being provided by a plurality of constant voltage sources. The number of constant voltage sources corresponds to the number of electrical loads. The energy supply device comprises a deactivatable balancing network. In this case, only the compensating currents are conducted via the balancing network, while the energy supply is provided via a direct electrical connection between the constant voltage source and the load. If a fault occurs, the balancing network can be deactivated. Faults in one branch thus do not affect the level of reliability of the energy supply in the remaining branches.

After a faulty component has been located and isolated, the sources that are still intact, and the intact loads, can be brought back into operation by suitably configuring the balancing network. The availability of the drive system can thus be increased.

The subject matter disclosed herein can be implemented in software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one exemplary embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An energy supply device for coupling a plurality of constant voltage sources to a plurality of electrical loads, wherein a number of constant voltage sources corresponds to a number of loads, the energy supply device comprising:
a plurality of first connectors configured to directly electrically connect an output of the plurality of constant voltage sources to an input of the plurality of electrical loads in each case;
a plurality of second connectors configured to electrically connect the output of the plurality of constant voltage sources to the input of an electrical load in each case, wherein each of the plurality of second connectors comprises a first switching element configured to directly electrically connect a series circuit comprising a first diode, a second diode, and a node, wherein the first diode and the second diode are electrically interconnected at the node, and wherein all the nodes are electrically interconnected; and
a control element configured to actuate the plurality of first switching elements together.

2. The energy supply device of claim 1, comprising a monitor to detect a malfunction in at least one of the plurality of constant voltage sources and the at least one of the plurality of electrical loads, wherein the control element is configured to open the at least one of the plurality of first switching elements if the monitor has detected a malfunction.

3. The energy supply device of claim 1, wherein each of the plurality of second connectors comprises a second switching element arranged in parallel with the first diode, and a third switching element arranged in parallel with the second diode.

4. The energy supply device of claim 3, comprising a controller configured to determine at least one first electrical current through the at least one of the first diode and an at least one second electrical current through the at least one of the second diode, and to actuate at least one of the relevant second switching element and the relevant third switching element if the first or second electrical current through at least one of the corresponding first diode and second diode exceeds a specified threshold.

5. The energy supply device of claim 4, wherein the controller is configured to calculate an electrical current flow through at least one of the first diodes and second diodes from a switching state of at least one of the plurality of constant voltage sources and the plurality of electrical loads.

6. The energy supply device of claim 4, wherein the controller is configured to determine an electrical current flow through at least one of the first diodes and second diodes on a basis of measured values, detected by sensors, in at least one of the plurality of constant voltage sources and the plurality of electrical loads.

7. An electric drive system, comprising:
an electrical energy supply device comprising a plurality of first connectors to directly electrically connect an output of a plurality of constant voltage sources to an input of a plurality of electrical loads in each case, a plurality of second connectors to electrically connect the output of the plurality of constant voltage sources to the input of the plurality of electrical loads in each case, wherein each of the plurality of second connectors comprises a first switching element configured to directly electrically connect a series circuit comprising a first diode, a second diode, and a node, wherein the first diode and the second diode are electrically interconnected at the node, and wherein all the nodes are electrically interconnected, and a control element configured to actuate the plurality of first switching elements together;

the plurality of constant voltage sources configured to each supply an electrical DC voltage; and the plurality of electrical loads that each comprise an electric drive device.

8. The electric drive system of claim 7, wherein each of the plurality of constant voltage sources comprises a disconnector configured to interrupt an electrical connection between each of the plurality of constant voltage sources and the electrical energy supply device.

9. The electric drive system of claim 7, wherein each of the plurality of constant voltage sources comprise an electrical energy store.

10. The electric drive system of claim 9, wherein a storage capacity of the electrical energy store is in each case adapted to a power consumption, to be expected, of the corresponding electrical load.

11. An electrically driven missile comprising an electric drive system, the electric drive system comprising:

an electrical energy supply device comprising a plurality of first connectors configured to directly electrically connect an output of a plurality of constant voltage sources to an input of a plurality of an electrical loads in each case, a plurality of second connectors configured to electrically connect the output of the plurality of constant voltage sources to the input of the plurality of electrical loads in each case, wherein each of the plurality of second connectors comprises a first switching element configured to directly electrically connect a series circuit comprising a first diode, a second diode, and a node, wherein the first diode and the second diode are electrically interconnected at the node, and wherein all the nodes are electrically interconnected, and a control element configured to actuate the plurality of first switching elements together;

the plurality of constant voltage sources configured to each supply an electrical DC voltage; and the plurality of electrical loads that each comprise an electric drive device.

* * * * *